United States Patent
Ip et al.

(10) Patent No.: US 10,404,398 B2
(45) Date of Patent: Sep. 3, 2019

(54) REPEATERLESS PASSIVE OPTICAL ADD/DROP MULTIPLEXED FIBER NETWORK

(71) Applicant: NEC LABORATORIES AMERICA, INC., Princeton, NJ (US)

(72) Inventors: Ezra Ip, West Windsor, NJ (US); Yue-Kai Huang, Princeton, NJ (US); Shuji Murakami, Monmouth Junction, NJ (US); Philip Ji, Cranbury, NJ (US)

(73) Assignee: NEC CORPORATION (JP)

( * ) Notice: Subject to any disclaimer, the term of this patent is extended or adjusted under 35 U.S.C. 154(b) by 0 days.

(21) Appl. No.: 15/912,781

(22) Filed: Mar. 6, 2018

(65) Prior Publication Data

US 2018/0262293 A1  Sep. 13, 2018

Related U.S. Application Data

(60) Provisional application No. 62/467,316, filed on Mar. 6, 2017.

(51) Int. Cl.
*H04J 14/02* (2006.01)
*H04Q 11/00* (2006.01)

(52) U.S. Cl.
CPC ........ *H04J 14/0215* (2013.01); *H04J 14/023* (2013.01); *H04J 14/0204* (2013.01); *H04J 14/0205* (2013.01); *H04J 14/0212* (2013.01); *H04J 14/0295* (2013.01); *H04J 14/0282* (2013.01); *H04Q 11/0005* (2013.01); *H04Q 2011/0016* (2013.01)

(58) Field of Classification Search
CPC .............. H04J 14/0215; H04J 14/0204; H04J 14/0205; H04J 14/0212; H04J 14/023; H04J 14/0295; H04J 14/0213; H04J 14/0206; H04J 14/0282; H04Q 11/0005; H04Q 2011/0016
See application file for complete search history.

(56) References Cited

U.S. PATENT DOCUMENTS

| | | | |
|---|---|---|---|
| 2006/0013589 A1* | 1/2006 | Odate | H04B 10/255 398/147 |
| 2014/0226987 A1* | 8/2014 | Eiselt | H04J 14/0213 398/85 |
| 2016/0080839 A1* | 3/2016 | Fuchs | H01Q 1/46 340/870.01 |

* cited by examiner

*Primary Examiner* — Ted M Wang
(74) *Attorney, Agent, or Firm* — Joseph Kolodka (57) ABSTRACT

Aspects of the present disclosure describe systems, methods, and structures for passive optical add/drop multiplexing (POADM) architectures that remove the prior art requirement of an optical amplifier (i.e., repeater-less) at the POADM nodes.

9 Claims, 11 Drawing Sheets

REPEATERLESS PASSIVE OPTICAL ADD/DROP MULTIPLEXED FIBER NETWORK

CROSS REFERENCE TO RELATED APPLICATIONS

This application claims the benefit of U.S. Provisional Patent Application Ser. No. 62/467,316 filed Mar. 6, 2017 which is incorporated by reference as if set forth at length herein.

TECHNICAL FIELD

This disclosure relates generally to optical communications and more specifically to a novel passive optical network architecture that advantageously does not employ optical amplifiers.

BACKGROUND

As is known, in both metro and regional optical networks, there are many nodes that require adding and dropping wavelength division multiplexed (WDM) channels at various locations along an optical fiber link. In conventional WDM networks, channel add/drops at nodes are performed by reconfigurable optical add/drop multiplexers (ROADM).

A typical ROADM requires configurable optical filtering/routing functions—such as a wavelength selective switch—for optical signal add/drop—as well as optical amplifiers to compensate for insertion loss resulting from the optical filtering. The use of these amplifiers (active modules) adds to the cost of implementing ROADM nodes and requires a significant amount of electrical power supplied to nodes employing same along the fiber network—and in particular any optical fiber trunk line(s).

Recently, advances in coherent detection technologies has greatly improved the sensitivity of optical transponders. Such advances have enabled a technique—"LO selection"—in which an optical receiver can detect any channels among a transmitted WDM spectrum without using optical filtering. Additionally, such coherent technologies have also led to the development of multi-span fiber links with passive optical add/drop multiplexing (POADM) architectures. In a contemporary POADM architecture, a node will employ passive splitters at a branch terminal to add channels when empty spectral slots are available and allow transponders of downstream branch terminals to receive any channel conveyed by the fiber. Notwithstanding these developments however, such prior art architectures still employ optical amplifiers to compensate for loss due to any fiber characteristics and resulting from passive splitting and consequently still require significant amounts of electrical power at the nodes.

SUMMARY

An advance in the art is made according to aspects of the present disclosure directed to repeaterless passive optical add/drop multiplexed network systems, methods, and structures that advantageously do not employ optical amplifiers (thus called repeaterless) at the POADM nodes.

In sharp contrast to the prior art, systems, methods and structures according to the present disclosure employ a distributed Raman amplification and remote optically pumped amplifiers (ROPAs) in a POADM link design, thus inline optical amplification is achieved without requiring electrical power to be supplied either at amplifier sites or be carried by cable.

Of further advantage, systems, methods, and structures according to the present disclosure also include special wavelength routing mechanisms to provide a bypass for optical pumps around splitters thereby reducing loss experienced by pump(s), thereby maximizing their effective "reach" in the network.

Finally, repeaterless POADM architectures according to the present disclosure exhibits substantial cost advantages over traditional ROADM or POADM as it requires no active elements (e.g., amplifiers, WSS's). Link performance may be maintained at levels equivalent to those contemporary architectures employing active elements by providing inline amplification through optical pumping. Of still further advantage, repeaterless architectures according to the present disclosure require less network provisioning as only transponder wavelengths need be provisioned. Finally, repeaterless POADM architectures according to the present disclosure enable a powerful anti-collision capability—that is when an active channel is interfered with at the same wavelength, the channel is quickly switched to a pre-assigned protection channel to advantageously continue service, thereby providing in-service, real-time trouble analysis and recovery.

BRIEF DESCRIPTION OF THE DRAWING

A more complete understanding of the present disclosure may be realized by reference to the accompanying drawing in which:

FIG. 2(A), FIG. 2(B), FIG. 2(C) are schematic diagrams showing system architecture(s) illustrative of: FIG. 2(A) start node; FIG. 2(B) junction points and branch nodes; and FIG. 2(C) end node—all according to aspects of the present disclosure;

FIG. 3(A), FIG. 3(B), FIG. 3(C), FIG. 3(D), FIG. 3(E), and FIG. 3(F) are plots illustrating: FIG. 3(A) power vs. distance; FIG. 3(B) power vs. wavelength; FIG. 3(C) power vs. distance; FIG. 3(D) power vs. wavelength; FIG. 3(E) power vs. distance; and FIG. 3(F) power vs. wavelength—for various nodes for (FIG. 3(A), FIG. 3(B)) two-span system without amplification; (FIG. 3(C), FIG. 3(D)) three-span system with backward Raman amplification, and (FIG. 3(E), FIG. 3(F)) four-span system using a remote optically pumped amplifier (ROPA) according to aspects of the present disclosure;

FIG. 5(A), FIG. 5(B), FIG. 5(C) are plots illustrating: FIG. 6(A), FIG. 6(B), FIG. 6(C) are plots illustrating: FIG. 6(C)

BER trace for SDN-facilitated transponder failure recovery—all according to aspects of the present disclosure;

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGS. comprising the drawing are not drawn to scale.

Figure 1:
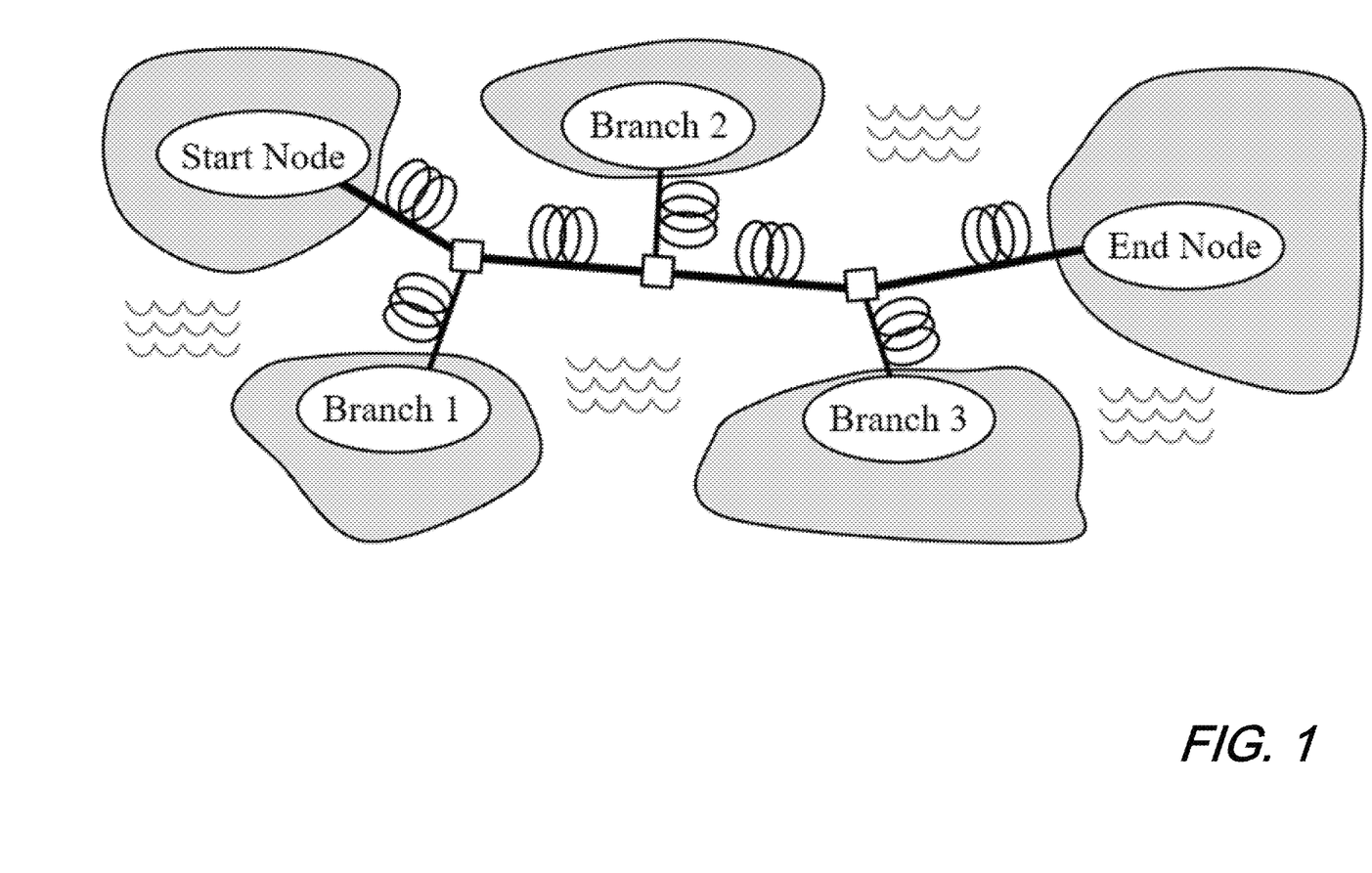
FIG. 1 is a schematic diagram illustrating a multispan fiber link with junction points and branch nodes employing POADM architecture.

Turning now to FIG. 1, there is shown an illustrative architecture of a multi-span fiber optic link with passive optical add/drop multiplexing (POADM)—according to aspects of the present disclosure. As may be observed from that figure, a node along the fiber link will use passive splitters at any branch terminal to add channels where empty spectral slots are available and allow transponders of any downstream branch terminal to receive any channel already in existence in the fiber.

To increase the maximum tolerable end-to-end loss in repeaterless POADM, systems, methods, and structures according to the present disclosure employ distributed Raman amplification and remote optically pumped amplifiers (ROPAs) which advantageously allow inline optical amplification without requiring electrical power to be supplied either at amplifier sites or be carried by cable. The routing of the signals and optical pumps are detailed in FIG. 2.

Figure 2A:
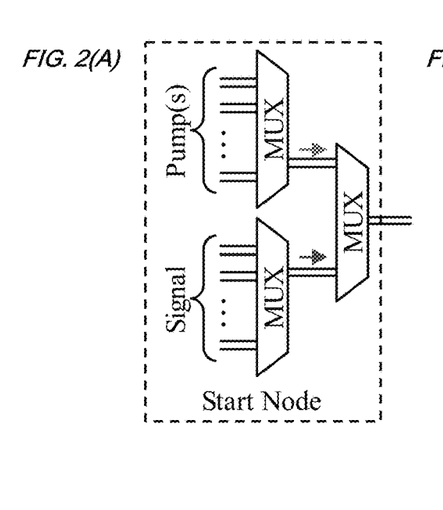
Figures 2B, 2C:
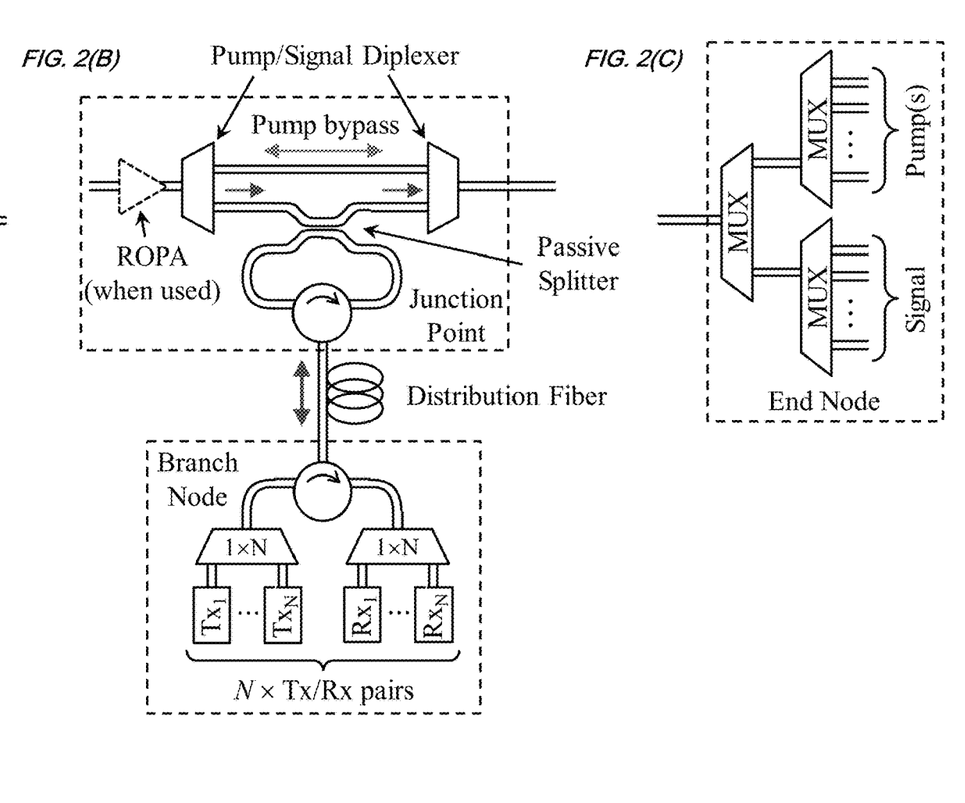

FIG. 2(A), FIG. 2(B), FIG. 2(C) are schematic diagrams showing system architecture(s) illustrative of: FIG. 2(A) start node; FIG. 2(B) junction points and branch nodes; and FIG. 2(C) end node—all according to aspects of the present disclosure. As will be readily appreciated by those skilled in the art, since optical pumps supplied by end nodes do not have to be shared with branch nodes, it is possible to provide a bypass for optical pumps around splitters to reduce loss "seen" by the pump, in order to extend (maximize) reach of the optical pumps. Advantageously pump bypass can be provided by inserting a pump/signal diplexer before and after a splitter.

Note that while diplexers will typically introduce an insertion loss of 0.5 dB for a given signal, the benefit of optical amplification far outweighs the extra loss in signal path. Furthermore, diplexers are only required up to the location of the ROPA (in case where a ROPA is used); or until the pump power has dropped sufficiently low as to provide no further Raman gain in case of Raman amplification.

Figure 3A:
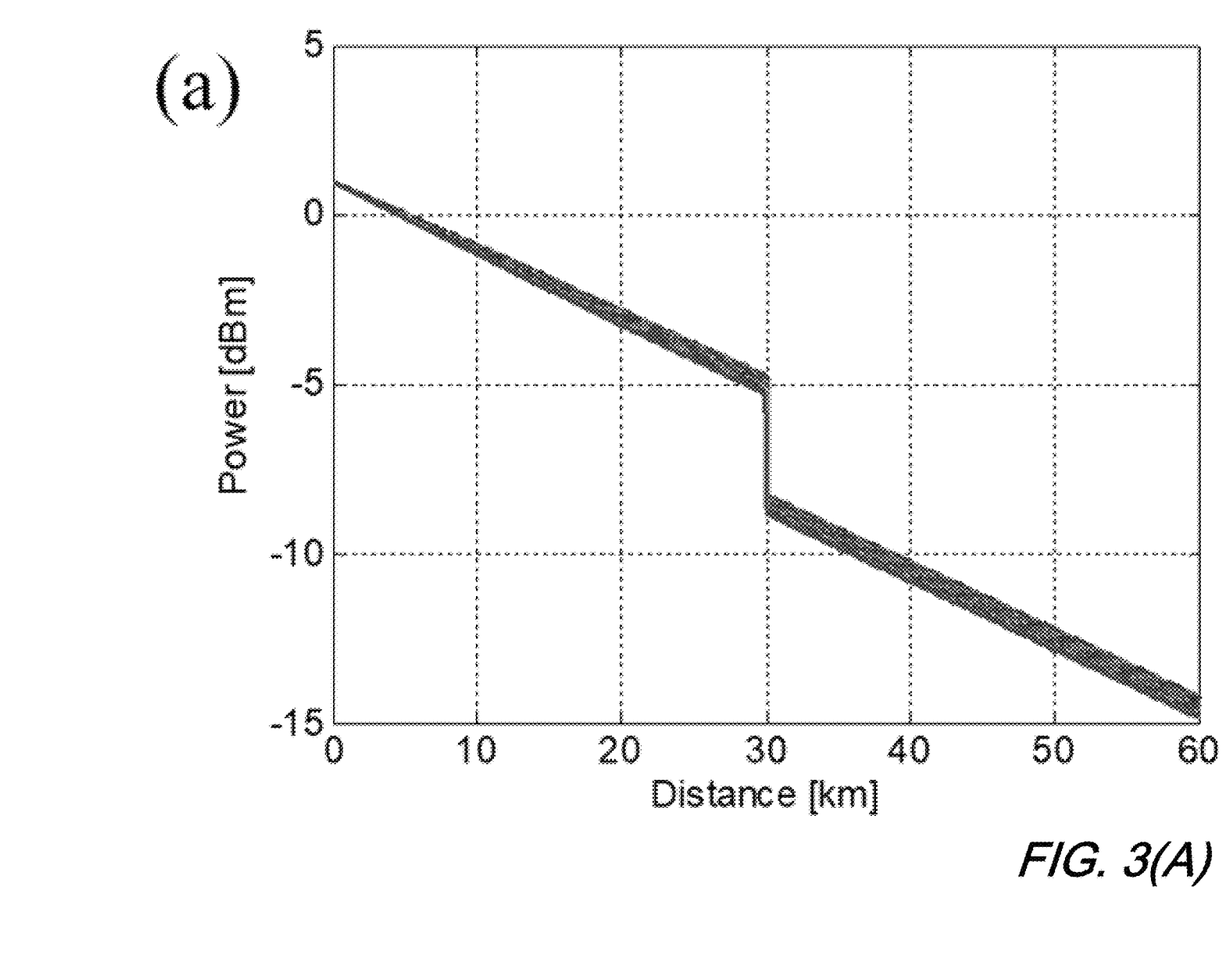
Figure 3B:
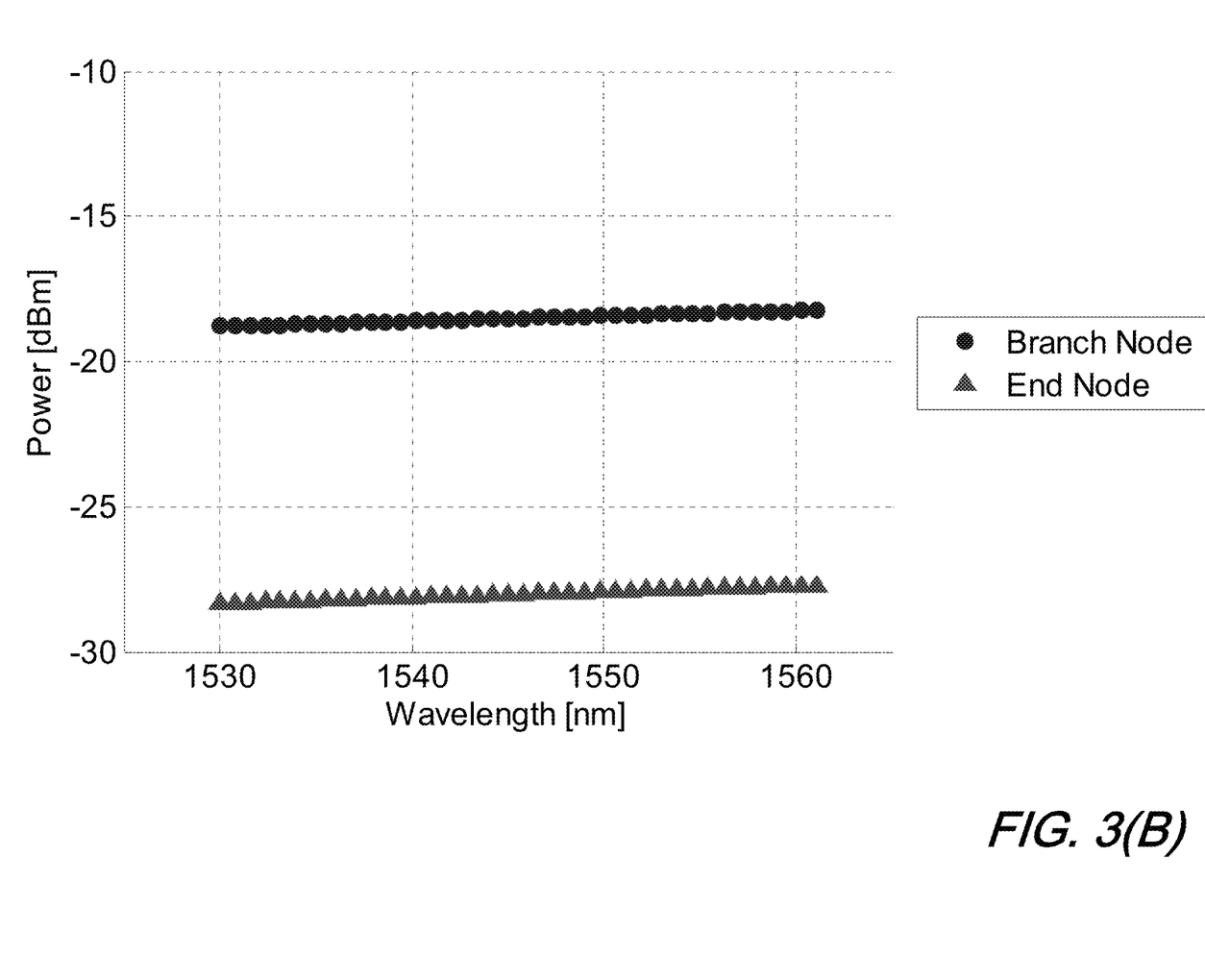
Figure 3C:
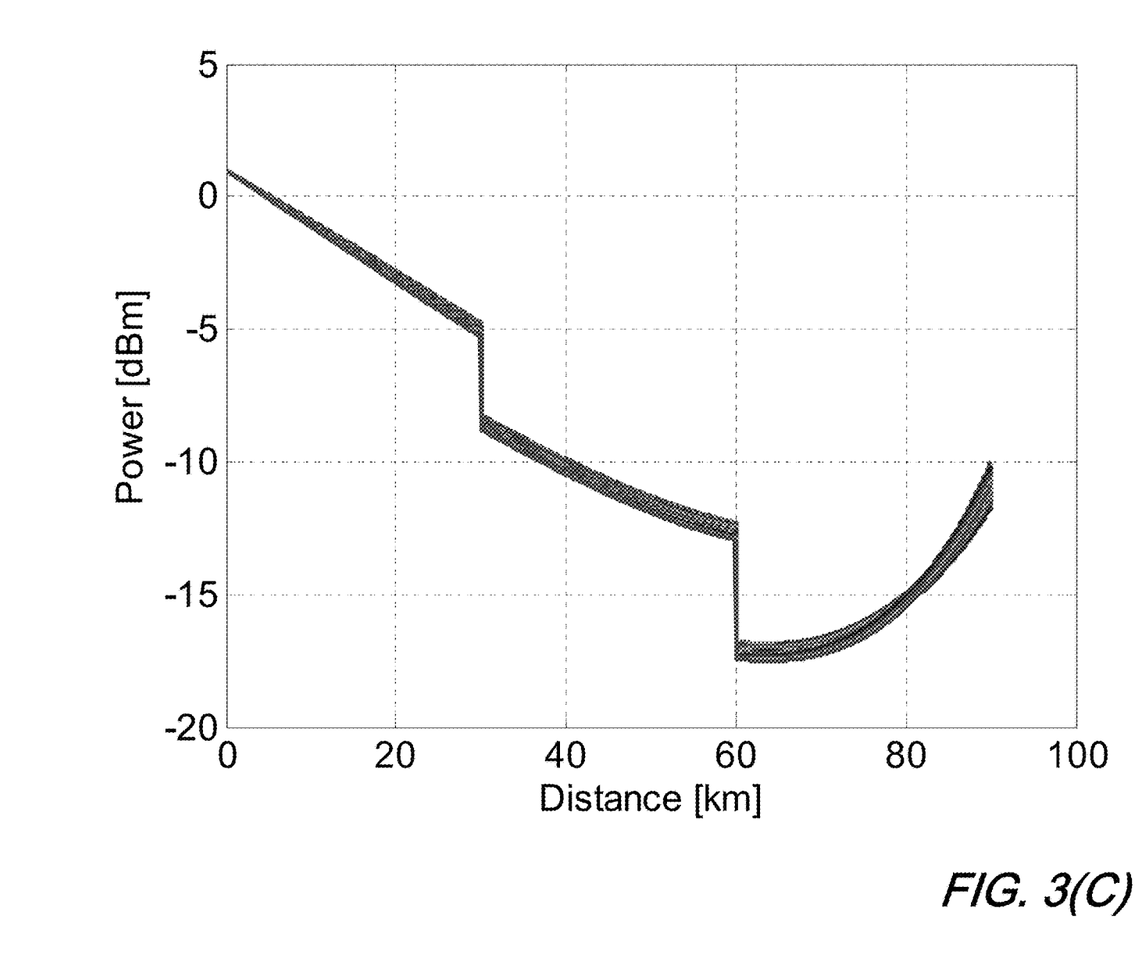
Figure 3D:
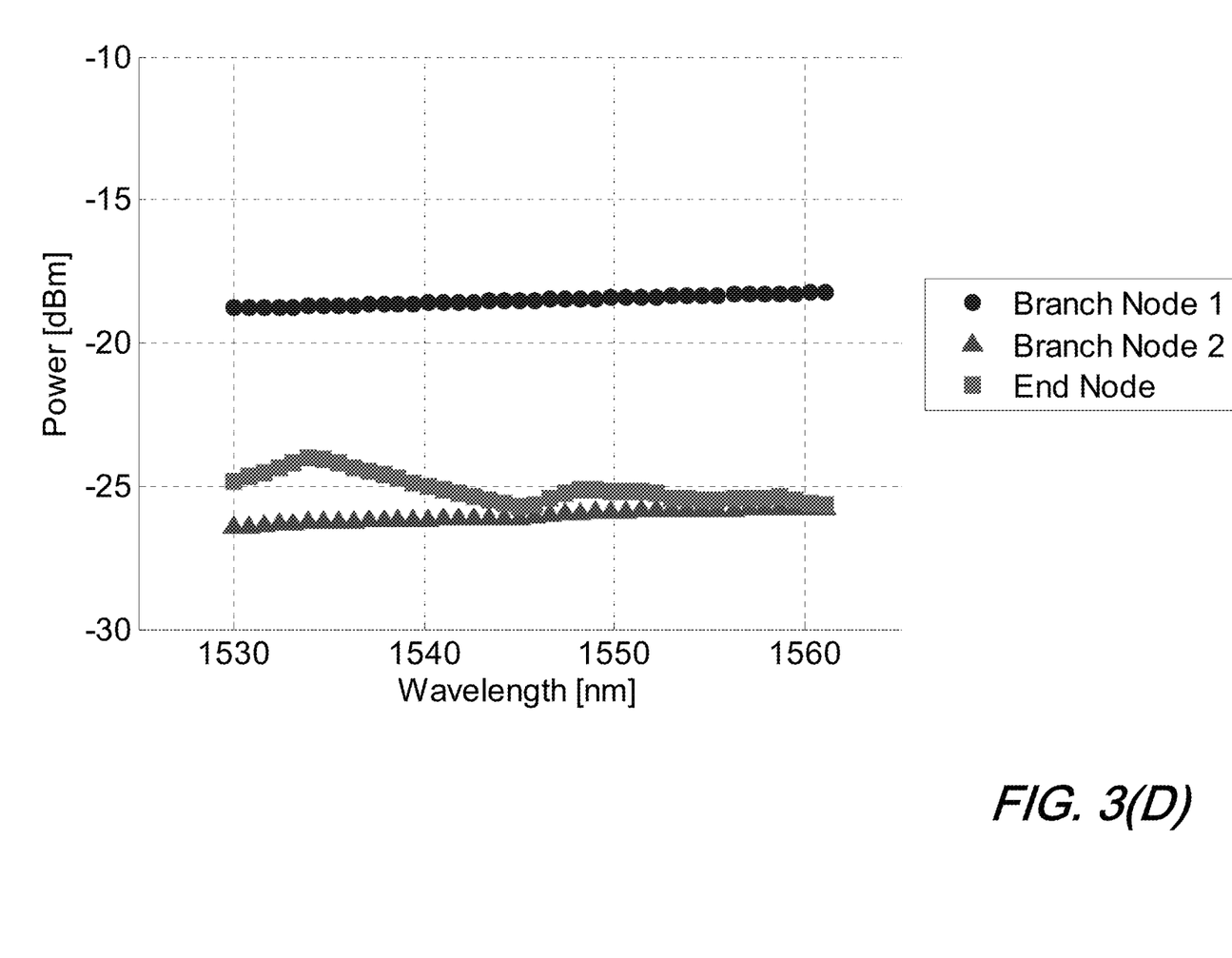
Figure 3E:
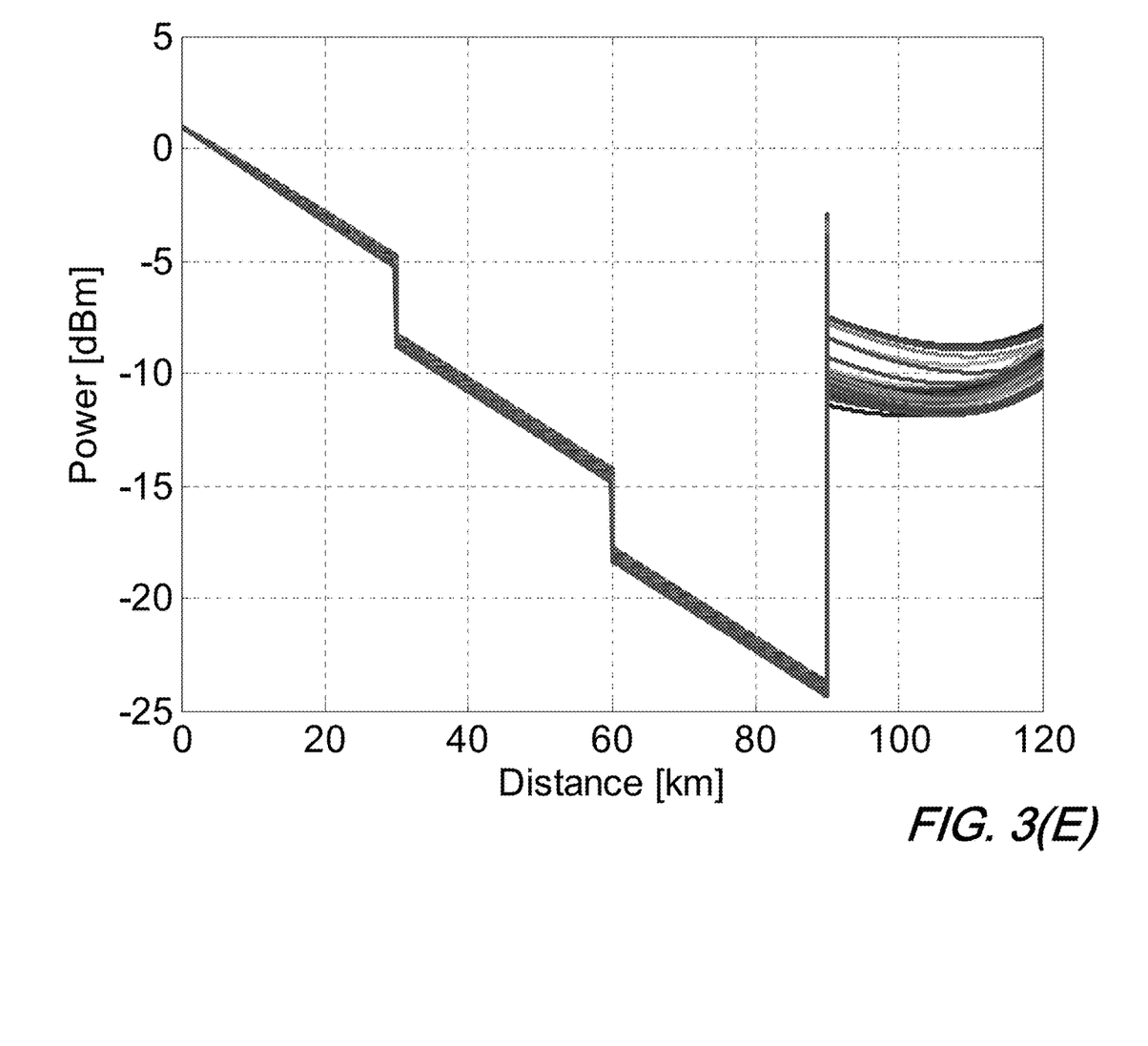
Figure 3F:
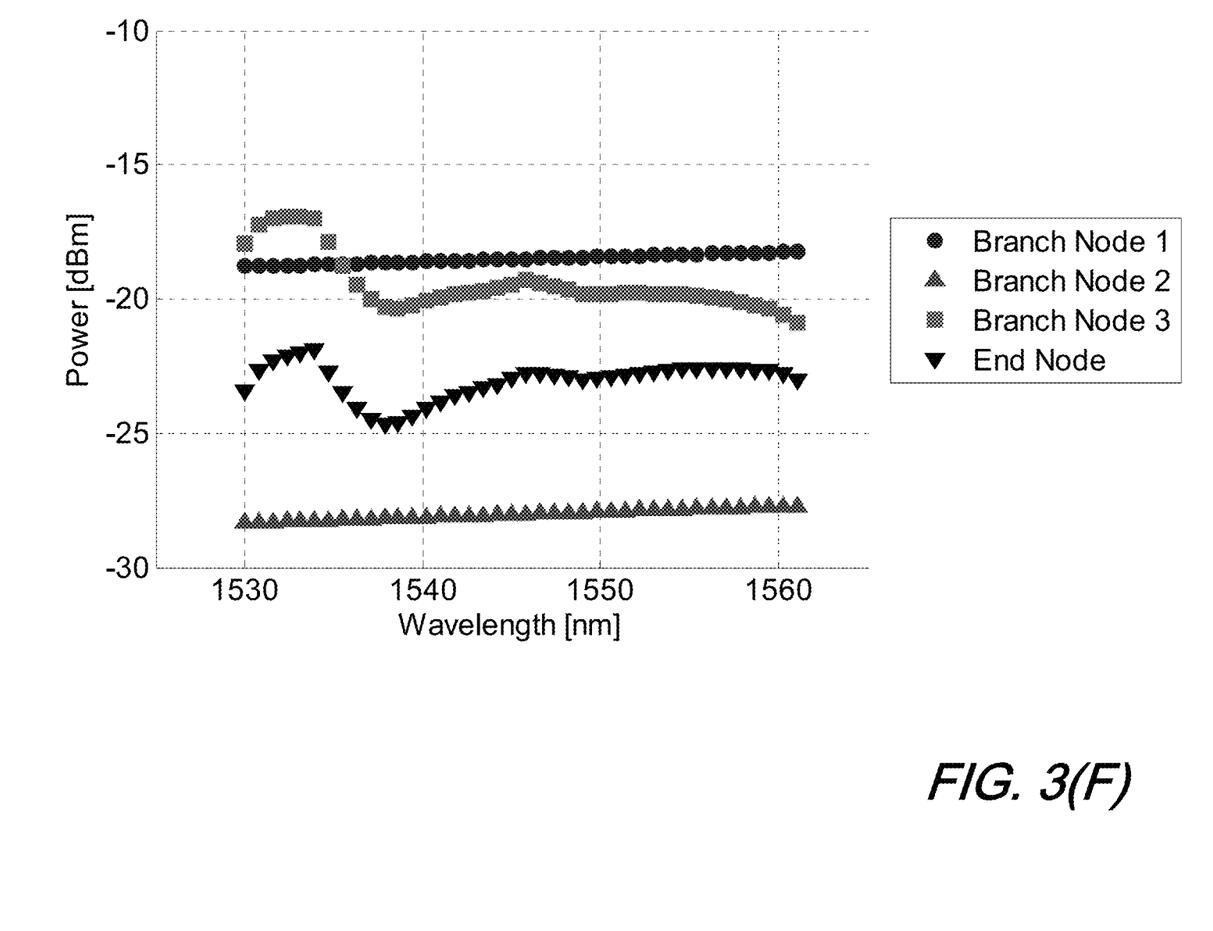

We note that FIG. 2(B) shows one specific design for POADM signal distribution where one 2×2 passive coupler/splitter, two circulators, one distribution fiber is considered. An alternative (more straightforward/basic) design will consider using two 2 distribution fibers (one for add and another for drop) with simply just one or two passive couplers. Systems, methods and structures according to the present disclosure will advantageously work for both signal distribution design at the POADM nodes as the in-line optical amplification occurs at the main trunk. Moreover, the passive 2×2 optical coupler at the junction point can advantageously be designed to exhibit a variable optical splitting ratio. Advantageously, the ratio can be adjusted according to the network configuration and the power budget at the specific POADM node A series of plots are shown illustrating improvement in system reach enabled by systems, methods, and structures according to the present disclosure. FIG. 3(A), FIG. 3(B), FIG. 3(C), FIG. 3(D), FIG. 3(E), and FIG. 3(F) are plots illustrating: FIG. 3(A) power vs. distance; FIG. 3(B) power vs. wavelength; FIG. 3(C) power vs. distance; FIG. 3(D) power vs. wavelength; FIG. 3(E) power vs. distance; and FIG. 3(F) power vs. wavelength—for various nodes for (FIG. 3(A), FIG. 3(B)) two-span system without amplification; (FIG. 3(C), FIG. 3(D)) three-span system with backward Raman amplification, and (FIG. 3(E), FIG. 3(F)) four-span system using a remote optically pumped amplifier (ROPA)—all according to aspects of the present disclosure Note that standard single-mode fiber (attenuation=0.2 dB/km, chromatic dispersion=17 ps/nm/km, effective area=80 $\mu m^2$) are assumed throughout. The trunk link uses 30 km spans (6 dB loss per span). At junction points, each 50/50 splitter has an insertion loss (IL) of 3.5 dB, while each diplexer has an IL of 0.5 dB (same loss for both signal and pump). For branch nodes, each circulator has an IL of 0.5 dB; the distribution spans comprise 10 km of SSMF (2 dB loss); and the use of 1×4 splitters with IL of 7 dB allow up to four transponders to be supported. We assume 100-Gb/s DP-QPSK coherent transponders with maximum transmit power of +5 dBm/ch, and sensitivity of −30 dBm. A 100 GHz channel grid is assumed.

With reference to that series of figures, FIG. 3(A) shows the baseline power vs. distance profile without any optical amplification. FIG. 3(B) shows the received power for all 40 channels at the branch node and at the end node. Note that as the branch node has 10 dB loss (two splitters+10 km SSMF+1×4 splitter), which is higher than the 7 dB loss of a trunk span+MUX, launch power per channel is limited by the added channels of the branch nodes, which is equivalent to launching at +2 dBm/ch at the start node.

It is clear that transmission over an additional span will result in signal power falling below the coherent receiver's sensitivity, so the system reach in this configuration is only two spans (60 km). Longer wavelengths have slightly higher power than shorter wavelengths due to Raman effect between the channels.

FIG. 3(C) shows the power vs. distance profile when two counter-propagating Raman pumps at 1426 and 1454 nm are injected from the end node at 24.3 and 25.0 dBm respectively, and the power vs. wavelength sweep in FIG. 3(D) shows that this configuration allows transmission over three spans (90 km). The stronger wavelength dependence of received power at the end node is due to ripple in the Raman gain.

Finally, FIG. 3(D) and FIG. 3(E) show the power vs. distance profile and received channel powers when a ROPA is used at the second-to-last junction. A 26 dBm 1480-nm ROPA pump is supplied at the end node. The strong wavelength dependence at branch node 3 and at the end node is due to the combination of the ROPA and Raman gain provided by the ROPA pump. Advantageously, it is possible to transmit four spans (120 km) in this configuration.

A simulation study shows the effectiveness of the repeaterless POADM architecture according to aspects of the present disclosure in extending the end-to-end fiber link loss without the need for active components at the main fiber trunk. The number of channels that can be added or dropped at a POADM node can be designed depending on the transponder output power and sensitivity. More passive splitting can be planned with the sacrifice of reach distance. Moreover, a high number of splitting paths can be implemented if the branch node employs optical amplification—at higher cost. Note the main fiber trunk is still purely passive as the branch node is designed to be off trunk and should have electric power to support optical transponders.

As should now be readily apparent to those skilled in the art, a passive optical add/drop network (POADN—see, e.g., FIG. 1) without active inline components can dramatically reduce network implementation costs. As the transponders at branch nodes are connected via passive couplers, the tolerable loss budget between any pair of nodes is determined by the transponder's output power and sensitivity—which then limits the geographic reach and the number of allowable nodes. Standard active nodes can be added to provide optical amplification for loss beyond tolerable budget(s), or to perform active optical switching if wavelength routing/reuse is required. Advantageously, it is possible to borrow techniques in repeaterless transmission to increase tolerable like loss. Accordingly, we may now show a specific illustrative example of a novel POADN where optical pumps for remote optically pumped amplifiers (ROPA) are supplied by the start and end active nodes. Advantageously, such system— according to aspects of the present disclosure—supports full C-band WDM for up to 203-km with total end-to-end loss of only 54.7-dB.

Coincident with recent improvements in networking technology, software-defined networking (SDN) has been introduced to fiber WDM networks to increase network flexibility and efficiency. With POADN, the process of network provisioning using SDN can further be simplified as only transponder wavelengths and output powers are required to be programmed/provisioned. Since there is neither active filtering nor wavelength reuse, channels can be dynamically added to POADN in a grid-less fashion with transparency across different vendors and/or transponder technologies. As we shall show, real-time superchannel add/drops using 4×100 GbE in 133.33-GHz bandwidth and 4×200 GbE in 150-GHz bandwidth and POADN also enables several powerful protection mechanisms. Using SDN-controlled transponders we have successfully shown that signal communication for 200 GbE 16-QAM channel(s) can be instantaneously recovered during unforeseen wavelength collision and transponder failure(s).

Figure 4:
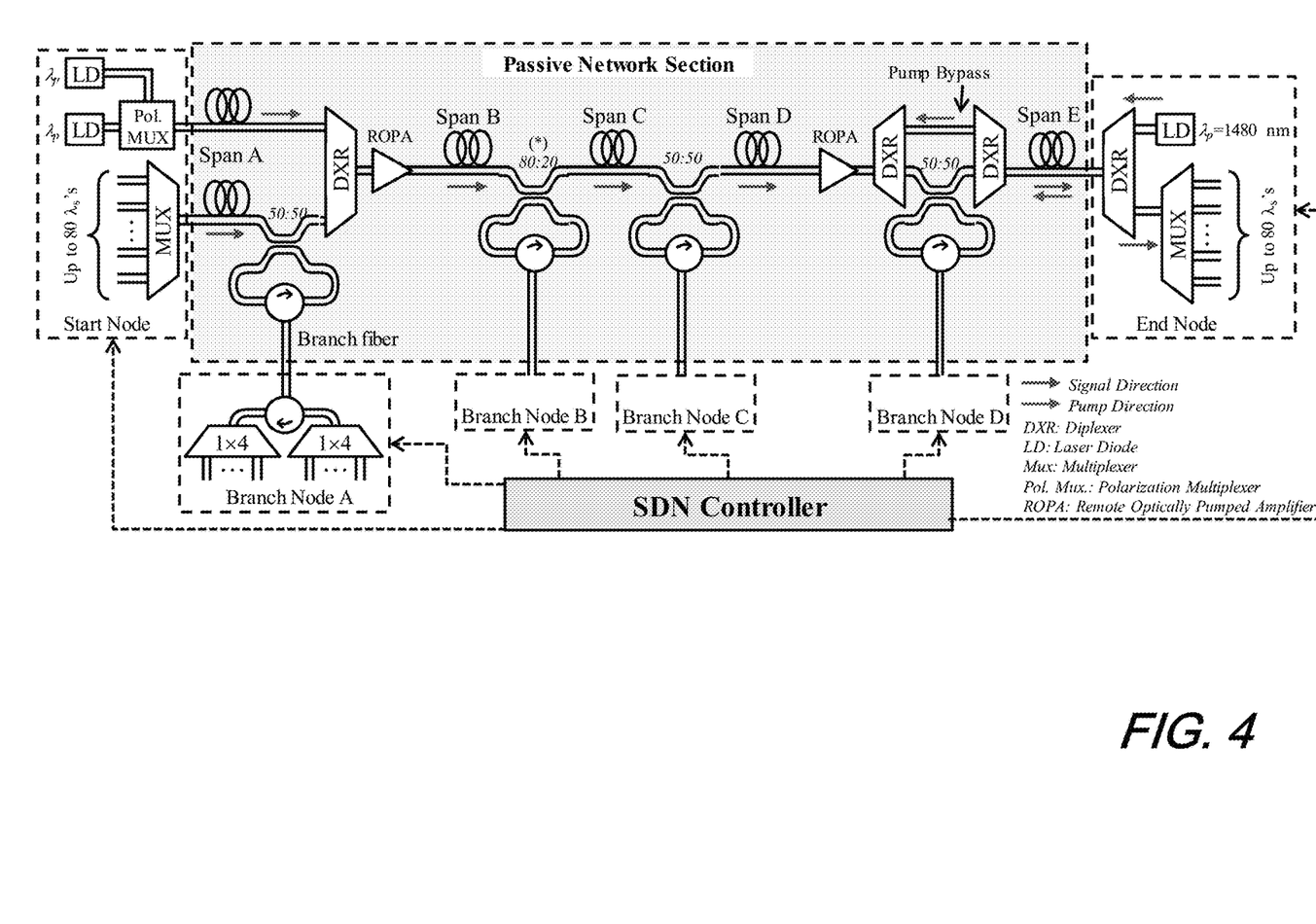
FIG. 4 is a schematic diagram showing an illustrative experimental setup for a 5-span remote optically pumped passive optical add/drop network (ROP-POADN) according to aspects of the present disclosure.

With reference now to FIG. 4, there is shown an illustrative setup of a 5-span remote optically pumped passive optical add/drop network (ROP-POADN) architecture according to aspects of the present disclosure. The setup includes five spans of standard single-mode fiber (SSMF) with average span length of 40.6-km and span loss of 8.5-dB. Passive splitters connect four branch nodes to a trunk line. Each branch node employs two circulators and two passive 1×4 splitters to allow up to four channels to be added/dropped by transponders without amplification. Signal flow is in a left-to-right direction, thus a bidirectional network can be realized by duplicating the system depicted for a reverse direction.

A centralized SDN controller is connected to all transponders to assign wavelengths. A branch node transponder can "drop" any channel that has been added upstream simply by tuning a coherent receiver's local oscillator (LO) frequency.

As may be observed in FIG. 4, to increase maximum tolerable loss of the trunk line, we insert two remote optically pumped amplifiers (ROPAs) before span B and after span D. The first ROPA includes 9 m of erbium-doped fiber (EDF) with NA=0.32; the second ROPA includes 12 m of the same EDF.

The start node provides a pump for the first ROPA by polarization multiplexing two 1480-nm continuous wave (CW) lasers each delivering up to 26-dBm output power. A dedicated pump delivery fiber is used to avoid pump power loss due to Raman effect. The pump is multiplexed to the trunk line via a signal/pump diplexer. The parallel fiber confirmation for span A can be replaced by a multi-core fiber (MCF) or multi-element fiber to improve spatial density.

The second ROPA is pumped from the end node, which multiplexes a backward propagating 1480-nm CW pump to the trunk line via a diplexer. To avoid splitter loss at the junction for branch node D, a pump bypass is created using two diplexers. In this experimental setup shown in the figure, 50:50 splitters are used at all junctions except for the junction between spans B and C, which uses a 80:20 splitter with the 80% port connecting the trunk line. These splitting ratios were selected to approximately (i) equalize the power per channel between the thru channels added by the start node with channels added by branch nodes A & B; and (ii) minimize the loss seen by the main trunk.

We first consider the transmission of 100-GbE channels using full C-band. At the start node, a multiplexer allows up to 80 channels to be multiplexed at 50 GHz spacing between 1530.72 to 1562.23 nm (191.90 to 195.85 THz). A real-time 100-GbE QPSK transponder with root-raised-cosine (RRC) pulse shaping at rolloff factor of 0.2 is used for the channel under test (CUT), while dummy channels are created by modulating a bank of distributed feedback (DFB) lasers in a dual-polarization Mach-Zehnder modulator, followed by delay interleaving to decorrelate odd and even neighbors. The real-time transponder transmits up to +2 dBm and has receiver sensitivity below −32 dbm.

Figure 5A:
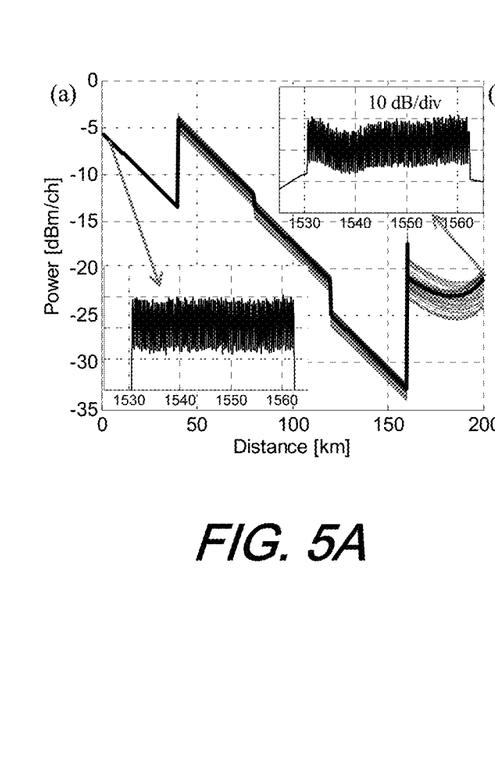
FIG. 5(A) calculated power profile for 80 channel transmission for 5-span system with two ROPAs (insets showing signal spectra at start and end nodes.

Pseudorandom binary sequences (PRBS) of $2^{31-1}$ were selected for real-time BER testing. FIG. 5(A) shows the calculated power-per-channel vs distance profile assuming all 80 channels are added at the start node at an optimized total launch power of +13.6 dBm. Average power per channel is shown by the thick black line. The pump powers at the ROPAs are 18.4-dBm and 14.7-dBm, providing gains of 8.2-dB and 13.1-dB respectively.

FIG. 5(A) insets show the measured spectra of the start and the end node. Power variation across wavelength is caused by Raman effect and gain ripple of the ROPAs. Each ROPA contributes ~2 dB in power variation across the channels. The optical signal-to-noise ration (OSNR) for the worst channels is approximately 20 dB.

Figure 5B:
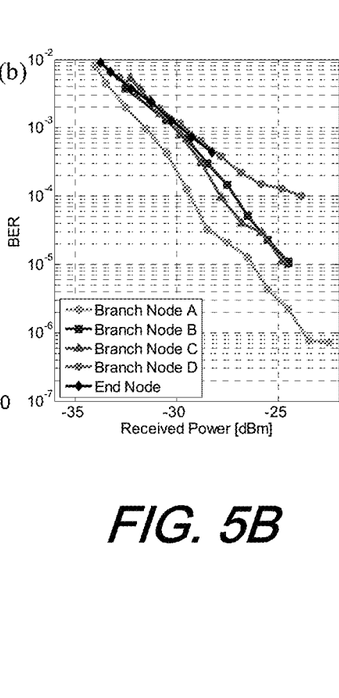
FIG. 5(B) BER vs received power at various nodes.
Figure 5C:
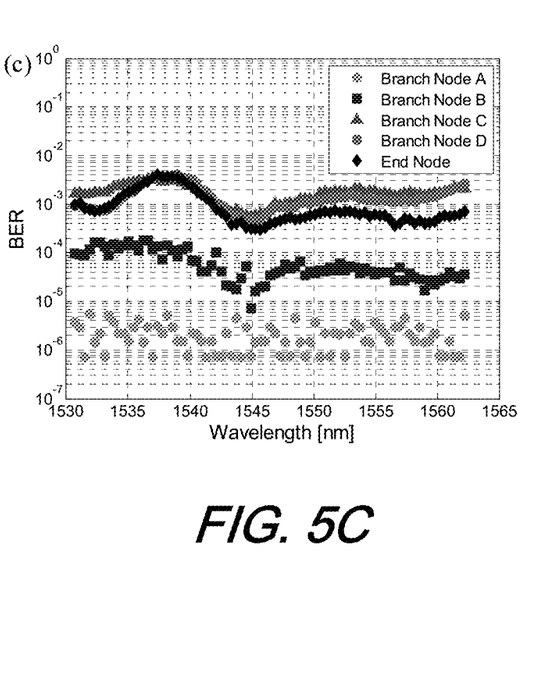
FIG. 5(C) BER vs wavelength sweep—all according to aspects of the present disclosure.

FIG. 5(B) shows BER vs received power at each junction's splitter output. BER floor is observed for branch node D and the end node due to noise of the second ROPA. FIG. 5(C) shows the BERs for all 80 channels measured at the branch nodes and end node.

Using POADN, gridless WDM can be easily facilitated. We demonstrated adding and dropping 4×100 GbE (QPSK) superchannel at 33.33-GHz spacing and 4×200 GbE (16QAM) superchannel at 37.5-GHz spacing. The superchannel were created using two real-time transponders each generating two subcarriers in odd/even fashion and added at a branch node A with center frequency at 193.5-THz (with 77 dummy channels from start node).

Figure 6A:
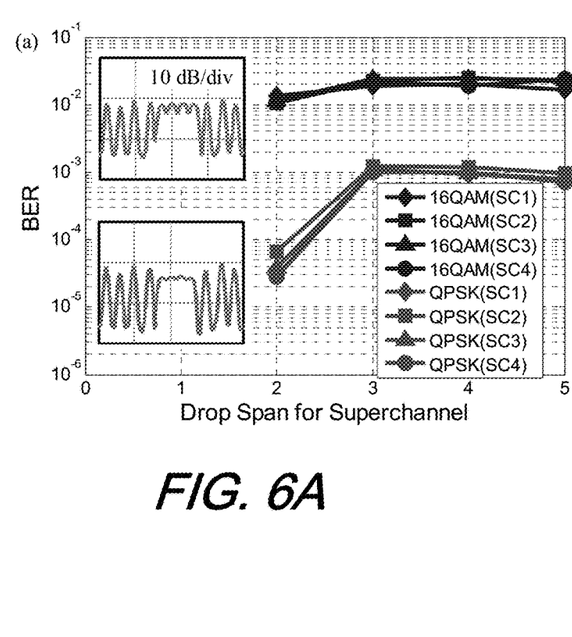
FIG. 6(A) subcarrier BERs for 4×100 GbE and 4×200 Be superchannel at each drop node.

FIG. 6(A) shows the respective superchannel spectra and the measured subcarrier BERs at different branch nodes. Due to poorer receiver sensitivity using 16 QAM, the powers of the four 200 GbE subcarriers have to be raised ~2 dB higher than the other WDM channels. All subcarriers obtained BER below the FEC limit and achieved error-free post-FEC.

Figure 6B:
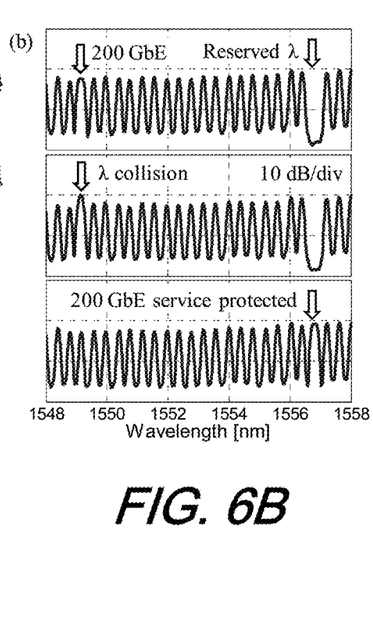
FIG. 6(B) snapshot of signal spectrum during wavelength collision.

Accordingly, we demonstrate the optical-layer re-configurability enabled by centralized SDN over POADN by showing the key survival features. An active 200 GbE channel between branch node A and the end node was first established at 193.5 THz. One real-time 16 QAM transponder with SDN-controlled wavelength tuning acted both as transmitter and receiver. When a wavelength collision was created by adding a 100 G channel at the start node, which could occur from either a wrong fiber connection or wavelength assignment error, the channel is automatically switched to a pre-assigned protection wavelength (192.55 THz) via centralized SDN control to continue service as shown in FIG. 6(B).

Figure 6C:
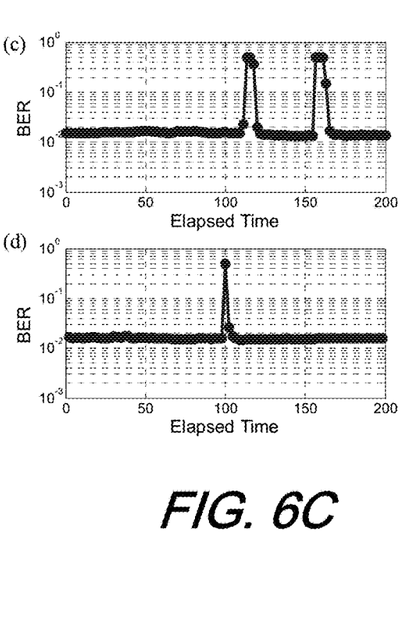

Real-time BERs were continuously recorded during the incident and plotted in FIG. 6(C), as the service loss was quickly recovered by the SDN-enabled anti-collision function. The reaction time in our experiments was limited to the status read-out speed (~2 s) of the transponder prototype. The active 200 GbE remained in service while the incident was being corrected, and then it was placed back to the original frequency with another shout outage period. In POADN, back-up transponders to be easily connected at the line side via passive splitters. For demonstration, we connected another 200 GbE transponder as backup to another splitter port (add-side) at branch node A. When the original 200 GbE transmitter was turned off to emulate transponder failure, the backup transmitter is quickly turned on by centralized SDN controller to re-establish line-side communication, as shown in the continuous BER recording—FIG. 6(C). These two examples highlight the effectiveness and simplicity of wavelength configuration/protection made possible by combining POADN and a centralized SDN controller.

At this point, while we have presented this disclosure using some specific examples, those skilled in the art will recognize that our teachings are not so limited. More specifically, our methods can be further extended in that the structural events can embed more temporal information and consider more sophisticated structures including considering more finegrained temporal information, e.g., the transition time distribution, to enrich mined structural events. Also, we have focussed on transition relations among log patterns. There are other useful relations among logs, such as running in parallel that may be employed. Those relations can be further modeled in the workflow graph using undirected edges. We also believe that the methods according to the present disclosure can achieve more utility in an interactive setting, where system admins can interactively explore the system behaviors with different focuses (parameter settings) on coverage, quality or connectivity.

Accordingly, this disclosure should be only limited by the scope of the claims attached hereto.

The invention claimed is:

1. An optical fiber network architecture comprising:
   a start node and an end node;
   one or more branch node(s);
   a plurality of optical fiber spans, optically connecting the start node, the end node, and the one or more branch node(s);
   wherein each span terminates at a junction point, each junction point including a pair of diplexers that separate signal and pump, propagate both in different paths, and re-combine them before introduction to a subsequent, next span; and
   a passive splitter in the signal path, said splitter interposed between the two diplexers, such that the signal is distributed to one of the branch node(s) and allowing the addition of a new channel by the branch node if an empty channel slot is available.

2. The optical fiber network architecture of claim 1 further comprising:
   one or more counter-propagating optical pumps situated at the end node, said end node including a concatenation of optical multiplexers and pump/signal diplexers to launch the pump(s) in to the optical fiber network.

3. The optical fiber network architecture of claim 1 further comprising:
   one or more counter-propagating optical pumps situated at the start node, said end node including a concatenation of optical multiplexers and pump/signal diplexers to launch the pump(s) in to the optical fiber network.

4. The optical fiber network architecture of claim 2 wherein the pump(s) include one or more tones at a frequency substantially 13 THz above that of the signal, thereby providing gain to the signal during propagation in a main transmission line of the network via distributed Raman amplification.

5. The optical fiber network architecture of claim 4 wherein the pump includes further additional wavelengths at integer multiples of ~13 THz above a first-order Raman pump such that cascaded Raman amplification is realized.

6. The optical fiber network architecture of claim 3 wherein the pump(s) include one or more tones at a frequency substantially 13 THz above that of the signal, thereby providing gain to the signal during propagation in a main transmission line of the network via distributed Raman amplification.

7. The optical fiber network architecture of claim 6 wherein the pump includes further additional wavelengths at integer multiples of ~13 THz above a first-order Raman pump such that cascaded Raman amplification is realized.

8. The optical fiber network architecture of claim 2 wherein the pump(s) include one or more tones at a frequency substantially 1480 nm that corresponds substantially to an erbium absorption band, and a main transmission line of the network includes one or more remote optically pumped amplifier (ROPA) at the junction points.

9. The optical fiber network architecture of claim 8 wherein the pump includes further additional wavelengths at integer multiples of ~13 THz above 1480 nm such that cascaded Raman amplification is realized.

* * * * *